United States Patent [19]
Donahue

[11] 3,949,398
[45] Apr. 6, 1976

[54] MTI PERFORMANCE ENHANCEMENT DEVICE WITH INSTANTANEOUS AUTOMATIC GAIN CONTROL

[75] Inventor: Thomas H. Donahue, Los Angeles, Calif.

[73] Assignee: International Telephone and Telegraph Corporation, New York, N.Y.

[22] Filed: Dec. 16, 1974

[21] Appl. No.: 532,842

[52] U.S. Cl. .............................. 343/7.7; 343/5 SM
[51] Int. Cl.² .......................................... G01S 9/42
[58] Field of Search ................ 343/5 AG, 5 SM, 7.7

[56] References Cited
UNITED STATES PATENTS

| | | | |
|---|---|---|---|
| 2,798,949 | 7/1957 | Scholz | 343/5 SM |
| 3,162,814 | 12/1964 | Adsen et al. | 343/5 AG |
| 3,220,002 | 11/1965 | Shrader | 343/7.7 |
| 3,863,240 | 1/1975 | Galvin | 343/7.7 X |

FOREIGN PATENTS OR APPLICATIONS 771,246  3/1957  United Kingdom ............. 343/5 SM

*Primary Examiner*—Malcolm F. Hubler
*Attorney, Agent, or Firm*—W. T. O'Neil

[57] ABSTRACT

An instantaneous gain controlling system particularly for coherent (MTI) radar systems. A gain controllable intermediate frequency amplifier, a COHO, and a phase detector are shown along with an MTI canceller which itself includes a delay device and a differencer are shown. The delay device provides a full pulse repetition period of delay, and the differencer operates to subtract the coherent video at the phase detector output from the same signal train, one pulse repetition interval earlier, to provide MTI cancellation. The delayed video train is full wave rectified, passed through a threshold circuit and an adjustable gain video amplifier and used as a pulse-by-pulse gain controlling signal for the intermediate frequency amplifier. Large signal blocks are thus prevented from overloading the receiver channel with consequent spectral spreading and MTI cancellation degradation.

5 Claims, 2 Drawing Figures

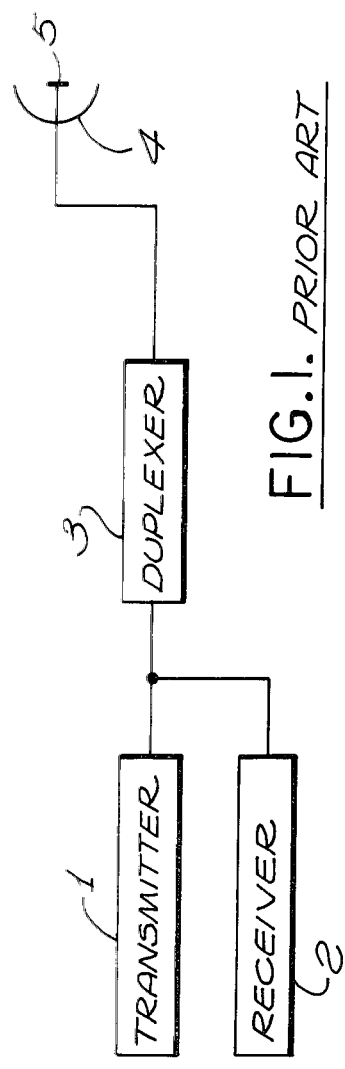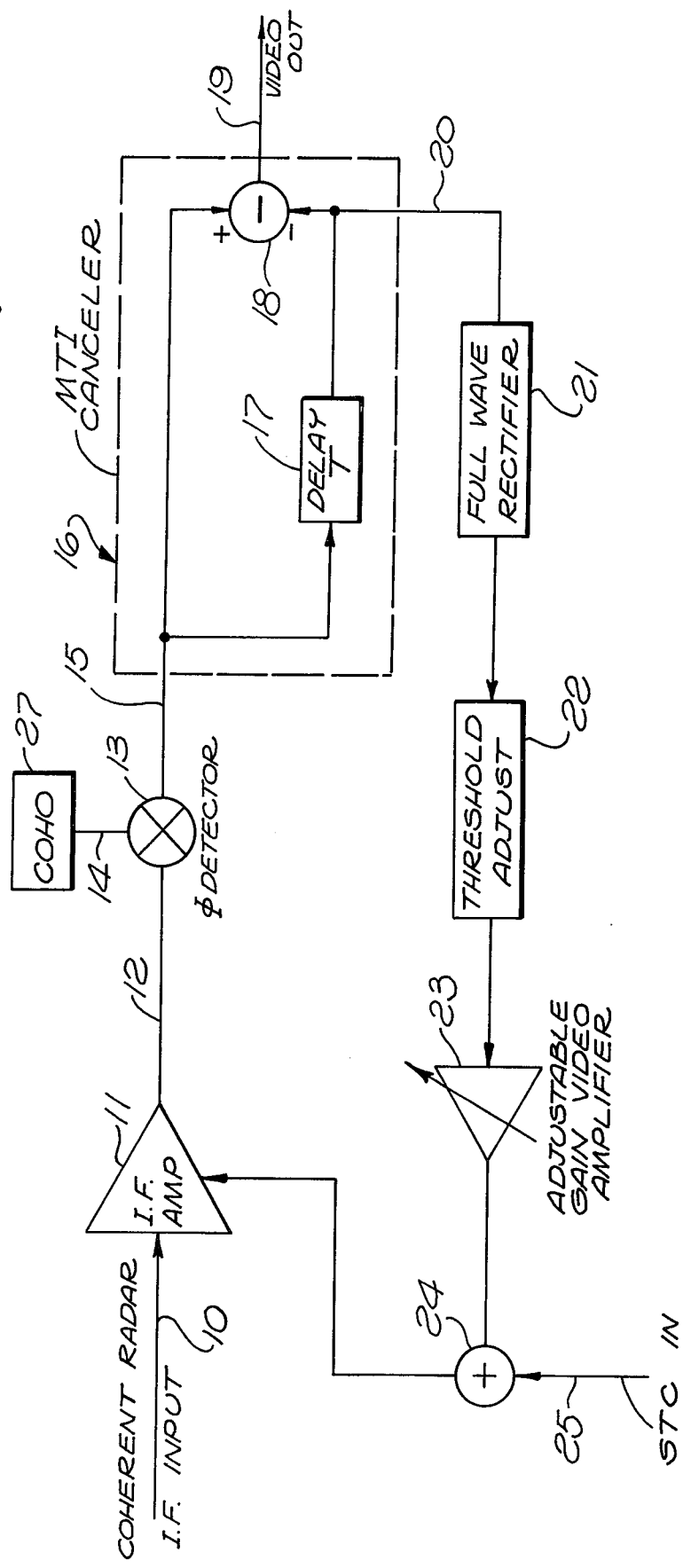
FIG.1. PRIOR ART
FIG.2.

MTI PERFORMANCE ENHANCEMENT DEVICE WITH INSTANTANEOUS AUTOMATIC GAIN CONTROL

BACKGROUND OF THE INVENTION

1. Field of the Invention

The invention relates to radar systems and more particularly, to instantaneous automatic gain control systems, particularly applicable to coherent radar systems.

2. Description of the Prior Art

In the prior art, both coherent MTI (Moving Target Indicator) radar and IAGC (Instantaneous Automatic Gain Control) are known in a variety of forms.

The textbook entitled "Radar Handbook" by Merrill I. Skolnik, (McGraw Book Company 1970) provides a relatively current assessment of the state of these arts, along with extensive bibliographic references for more detailed study thereof.

The aforementioned Radar Handbook treats the subject of MTI Radar in Chapters 17 and 18. Moreover, Chapter 19 of this same text deals with Pulse-Doppler Radar, which may be thought of as another form or variation in the general art of moving target detecting radars.

In basic terms, the so-called coherent MTI radar systems as a class, to which the present invention particularly applies, may be thought of as relying on the Doppler phenomenon. Coherent MTI radar requires the use of stable transmitting and receiving components. In the usual pulse magnetron radar transmitter, the radio frequency starting phase cannot be duplicated from pulse-to-pulse, however, a so-called coherent oscillator (COHO) is used, usually in the IF domain, to "remember" the transmitted phase for later comparison purposes. Thus, a phase detector may be employed to reduce the received signals through the intermediate frequency amplifier to the video domain, the said phase detector operating against the aforementioned COHO to produce bi-polar video output pulses. The instantaneous video polarity and amplitude corresponding to the echo of a given moving target results, in effect, from modulation at the Doppler frequency corresponding to the velocity of the moving target. The bi-polar video amplitude thus discretely assumes an amplitude varying (from pulse repetition period interval to pulse repetition period) from a maximum positive amplitude to a maximum negative amplitude at the said Doppler rate. In a bi-polar video signal train containing a plurality of moving target echo signals, the instantaneous signal amplitudes within any one given pulse repetition interval are thus not the same, even if the reflected energy from them were substantially the same.

In the MTI canceller, the full repetition period delay device and the differencer provides for subtraction of one video train from that of the next pulse repetition interval. Accordingly, the quality of cancellation achieved is critically dependent upon the preservation of video waveforms and the avoidance of various forms of distortion.

One of the types of distortion which can result in severe MTI performance degradation is spectral spreading caused by overloading, of the IFF amplifier for example, in the receiver circuitry.

Various forms of gain control have been implemented in order to deal generally with this problem, but most of these are either operative within the IF amplifier itself, or not generally applicable to the coherent radar problem if they rely on a pulse feedback arrangement because of the aforementioned variation in echo pulse amplitudes from the system phase detector.

Since signal strengths follow the inverse fourth power law in transmit-receive radar echo ranging, compensatory variation of the receiver gain throughout each pulse repetition interval is effected by applying a gain-controlling signal which gradually varies throughout at least a part of each pulse repetition period. This is generally referred to as STC (Sensitivity Time Control). STC systems are also known and are described, for example, in the aforementioned Radar Handbook in Chapter 5, and Section 5.6.

The manner in which the present invention provides a unique, improved and useful pulse-to-pulse gain control in the receiver of a coherent MTI radar system, will be understood as this description proceeds.

SUMMARY OF THE INVENTION

It may be said to have been the general objective of the present invention to provide means for preventing large clutter signals from overloading the IF amplifier in a coherent MTI radar system to avoid the performance degradation which results from spectral spreading due to strong signal overloading.

The present invention contemplates the environment of a coherent MTI radar system, including a gain-controllable IF amplifier configuration (well known per se), the COHO, phase detector and MTI canceller. The canceller is of the type which extracts the difference on a pulse-to-pulse basis, between a given video signal train and one delayed a full repetition period therefrom. Thus, the MTI canceller includes broad band delay means having a delay equal to the said full pulse repetition period, i.e., for a time equal to the reciprocal of the pulse repetition frequency of the radar. Delay lines or other devices for providing such a delay are, of course, well known in this art.

The novel combination takes the bi-polar output of the phase detector, as delayed by the aforementioned delay means, full wave rectifies it and applies it as a gain control signal through a threshold circuit and through a video amplifier, the gain of the latter preferably being adjustable for selection of the degree of control desired for signals of amplitude greater than the selected threshold level. This pulse-to-pulse control signal is applied to the IF amplifier, for example, by mixing with the sensitivity-time-control (STC) terminal of the IF amplifier, or in accordance with other known expedients for applying a gain control function to the IF amplifier.

The detailed manner in which the present invention may be instrumented will be described hereinafter.

BRIEF DESCRIPTION OF THE DRAWINGS

FIG. 1 is a simplified block diagram of a transmitting and receiving pulse ECHO ranging system of the general type to which the present invention applies.

FIG. 2 is a schematic block diagram of the receiver-associated components illustrating the elements of the present invention.

DESCRIPTION OF THE PREFERRED EMBODIMENT

Referring now to FIG. 1, a pulsed radar transmitter 1 and a radar receiver 2 are illustrated, operating through a duplexer 3 in connection with an antenna 5 and associated beam-forming reflector 4. These components are typical of radar systems, and need not be explained further since they are so well known in this art.

Referring now to FIG. 2, the components illustrated are within, or associated with, a receiver 2 of FIG. 1. In FIG. 2 the input 10 to IF amplifier 11 would be provided by an IF mixer operating in conjunction with a stable local oscillator. Received signals in the IF domain are passed along lead 12 to phase detector 13. The so-called COHO (Coherent Oscillator) 27 provides the well known "transmitted phase remembering" signal in the IF domain along lead 14, in a manner well known, per se.

Accordingly, the output of phase detector 13 along lead 15 is bi-polar video. Each signal within the signal train in each pulse repetition interval along the lead 15 varies from a maximum positive to maximum negative value, the rate of variation being determined by the Doppler effect corresponding to the velocity of the corresponding target.

The MTI canceller 16 functions to compare, on a pulse-to-pulse basis, the video trains in two successive pulse repetition periods. The process is essentially continuous in that the bi-polar echo signals within any given pulse repetition interval are compared with the period preceding, since the delay line 17 provides a full pulse repetition period of delay. Comparator or subtraction circuit 18 simply functions to effect this comparison, so that the video output signal 19 contains substantially only signals corresponding to moving targets. Signals corresponding to fixed targets, such as clutter, etc., are cancelled out in circuit 18 since these exhibit substantially no variation from period to period.

The aforementioned description of coherent MTI elements if, of course, prior art per se, but is described to this extent herein, in order to provide for a fuller understanding of the present invention.

On lead 20 the delayed pulse train from the MTI canceller 16 is passed through a full wave rectifier 21. This rectifier converts the bi-polar signals on 20 to uni-polar signals and passes them through "threshold adjust" circuit 22. As hereinbefore indicated, any given moving target echo signal viewed over a number of pulse repetition intervals will vary from a maximum positive to a maximum negative amplitude, thus, although the combination of the present invention could be considered operable with only half wave rectification at 21, a full wave rectifier is required in order to "catch" the moving target signal in every pulse repetition period.

In general, useable radar receiver dynamic range extends at least 15 to 20 decibels above the noise level, however, signals on the order of 20 or 30 decibels above noise may well be capable of overloading the IF amplifier 11. Such overloading introduces spectral spreading, a fact which is well known, per se, in the radar art. Since, as also hereinbefore indicated, the performance of an MTI canceller is dependent upon essentially a point-by-point signal comparison, such spectral spreading leaves a residue which would appear at video output 19. Such a residue constitutes a deterioration of MTI system performance, and is, therefore, an undesirable effect. If the threshold of circuit 22 is set to pass signals which are substantially above noise, but not particularly close to the saturation level of the receiver IF amplifier 11, then a range of response which allows the gain control circuit to deal with relatively high amplitude signal, is provided. If, for example, the receiver saturation level were somewhere on the order of 20 to 30 decibels above noise, the threshold setting of circuit 22 might be on the order of 15 decibels. The rectifier circuit 21 of course, does not include any filtering and is, therefore, a broad band device.

Proceeding now from the threshold circuit 22, a video amplifier 23 operates to provide some gain and to provide, on its output, an amplified signal train representing only signals exceeding the threshold level setting of 22 to the summer 24. As the said summer 24 is shown, it has been assumed that an STC signal is provided on lead 25, and accordingly the signal on lead 26 is the sum of the STC waveform and the output of the amplifier 23. Of course, the pulse gain control signals thus included on lead 26 are applied in a sense to reduce the gain on an instantaneous basis in the IF amplifier 11.

From a familiarity with feedback circuit theory, it will be recognized that the gain of the amplifier 23 is the principle factor in determining to what extent the output signals 12 of the IF amplifier are permitted to vary at the output 19. If the gain of amplifier 23 is relatively high, the system will be relatively "tight", and the signals on 12 will appear to be amplitude limited, although the apparent limiting is the result of only instantaneous gain control and not due to clipping or limiting so as to cause spectral spreading.

From an understanding of the foregoing, certain modifications and variations will suggest themselves to those skilled in this art. Accordingly, it is not intended that the drawing or this description should be regarded as limiting the scope of the invention, these being typical and illustrative only.

In the operation of the system of the invention, it is considered undesirable for the threshold of the circuit 22 to be extended downward into the noise. The purpose of the present invention is not served by such a low threshold, and the effect of amplified noise on the gain control signal on lead 26 is disadvantageous.

What is claimed is:

1. A device for reducing the effects of signal overloading in the receiver of a coherent radar system, said system including radio frequency pulse transmitting means and said receiver for detecting target echoes corresponding to said pulses, comprising:

a gain controllable intermediate frequency amplifier within said receiver having signal and gain controlling input terminals;

a coherent oscillator;

a phase detector having as its inputs the outputs of said oscillator and said intermediate frequency amplifier, the output of said phase detector comprising a train of bi-polar echo video signals each amplitude modulated at the Doppler frequency corresponding to the velocity of a corresponding target;

an MTI canceller for delaying phase detector output signals by one pulse repetition interval, and for extracting the difference of delayed and undelayed signal trains, said canceller thereby providing an output comprising substantially only bi-polar video signals corresponding to moving targets;

rectifying means responsive to said delayed phase detector signals to produce a train of uni-polar pulses comprising all signals from said phase detector output;

and means for applying said uni-polar pulse train to said intermediate frequency amplifier as an inverse feedback gain-controlling signal on a pulse-to-pulse basis within said uni-polar pulse train.

2. Apparatus according to claim 1 in which said rectifying means is a full wave rectifier for generating said train of uni-polar pulses during each pulse repetition interval of said radar irrespective of the instantaneous polarity of any echo signal at the output of said phase detector.

3. Apparatus according to claim 2 in which a threshold circuit is provided between the output of said rectifying means and said gain control input terminal of said intermediate frequency amplifier to provide pulsed gain control only for signals exceeding a predetermined threshold amplitude.

4. Apparatus according to claim 3 in which an adjustable gain video amplifier is included between the output of said threshold circuit and said gain control terminal of said intermediate frequency amplifier to provide for adjustment of the effectiveness of said inverse feedback for signals exceeding said predetermined threshold amplitude.

5. Apparatus according to claim 4 including a summing circuit in the circuit between said adjustable gain video amplifier and said gain control terminal, said summing circuit also being adapted to accept a sensitivity-time control signal, the control signal thus applied to said gain control terminal being the sum of said adjustable gain video amplifier and said sensitivity-time control signal.

* * * * *